(12) United States Patent
Deng et al.

(10) Patent No.: US 8,977,420 B2
(45) Date of Patent: Mar. 10, 2015

(54) VEHICLE PROCESSION CONTROL THROUGH A TRAFFIC INTERSECTION

(75) Inventors: Bing Deng, Shanghai (CN); Jiang Du, Beaverton, OR (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 13/805,445

(22) PCT Filed: Jun. 23, 2010

(86) PCT No.: PCT/CN2010/000919
§ 371 (c)(1),
(2), (4) Date: Mar. 11, 2013

(87) PCT Pub. No.: WO2011/160255
PCT Pub. Date: Dec. 29, 2011

(65) Prior Publication Data
US 2013/0179025 A1    Jul. 11, 2013

(51) Int. Cl.
| G08G 1/00 | (2006.01) |
| B60W 30/165 | (2012.01) |
| B60W 30/18 | (2012.01) |
| B60W 50/00 | (2006.01) |
| G08G 1/07 | (2006.01) |

(52) U.S. Cl.
CPC .............. *G08G 1/00* (2013.01); *B60W 30/165* (2013.01); *B60W 30/18154* (2013.01); *B60W 50/0098* (2013.01); *G08G 1/07* (2013.01); *B60W 2050/008* (2013.01); *B60W 2550/408* (2013.01)
USPC ............................................. 701/23; 340/932

(58) Field of Classification Search
USPC ........................................... 701/23; 340/932
See application file for complete search history.

(56) References Cited

U.S. PATENT DOCUMENTS

| 2004/0181339 A1* | 9/2004 | Mukaiyama ................... 701/301 |
| 2008/0012726 A1* | 1/2008 | Publicover .................... 340/932 |

FOREIGN PATENT DOCUMENTS

| CN | 101101702 A | 1/2008 |
| JP | 2009223845 A | 10/2009 |
| WO | WO 20080933033 | 8/2008 |

OTHER PUBLICATIONS

Du, John, Smart and Connected Vehicle: An Insightful Look at EN-V; Expo Connectivity Forum; Shanghai, CN, Jun. 23, 2010.

* cited by examiner

*Primary Examiner* — Mary Cheung
*Assistant Examiner* — Yuen Wong

(57) ABSTRACT

A method for controlling vehicle procession through an intersection includes monitoring movement of a first vehicle through the intersection, and synchronizing movement of a second vehicle following the first vehicle through the intersection to the first vehicle movement through the intersection.

8 Claims, 3 Drawing Sheets

VEHICLE PROCESSION CONTROL THROUGH A TRAFFIC INTERSECTION

CROSS-REFERENCE TO RELATED APPLICATIONS

This application claims the benefit of International Application No. PCT/CN2010/000919, filed Jun. 23, 2010, which is hereby incorporated by reference in its entirety.

TECHNICAL FIELD

This disclosure is related to automated or semi-automated control of a motor vehicle.

BACKGROUND

The statements in this section merely provide background information related to the present disclosure and may not constitute prior art.

Autonomous driving systems and semi-autonomous driving systems utilize inputs regarding the road and other driving conditions to automatically control throttle and steering mechanisms to operate a vehicle.

Highway, road, and street intersections and associated traffic lamps are used to facilitate traffic flow. There are time delays associated with moving a queue of in-line vehicles through an intersection after a traffic lamp permits traffic flow.

SUMMARY

A method for controlling vehicle procession through an intersection includes monitoring movement of a first vehicle through the intersection, and synchronizing movement of a second vehicle following the first vehicle through the intersection to the first vehicle movement through the intersection.

BRIEF DESCRIPTION OF THE DRAWINGS

One or more embodiments will now be described, by way of example, with reference to the accompanying drawings, in which.

DETAILED DESCRIPTION

Figure 1:
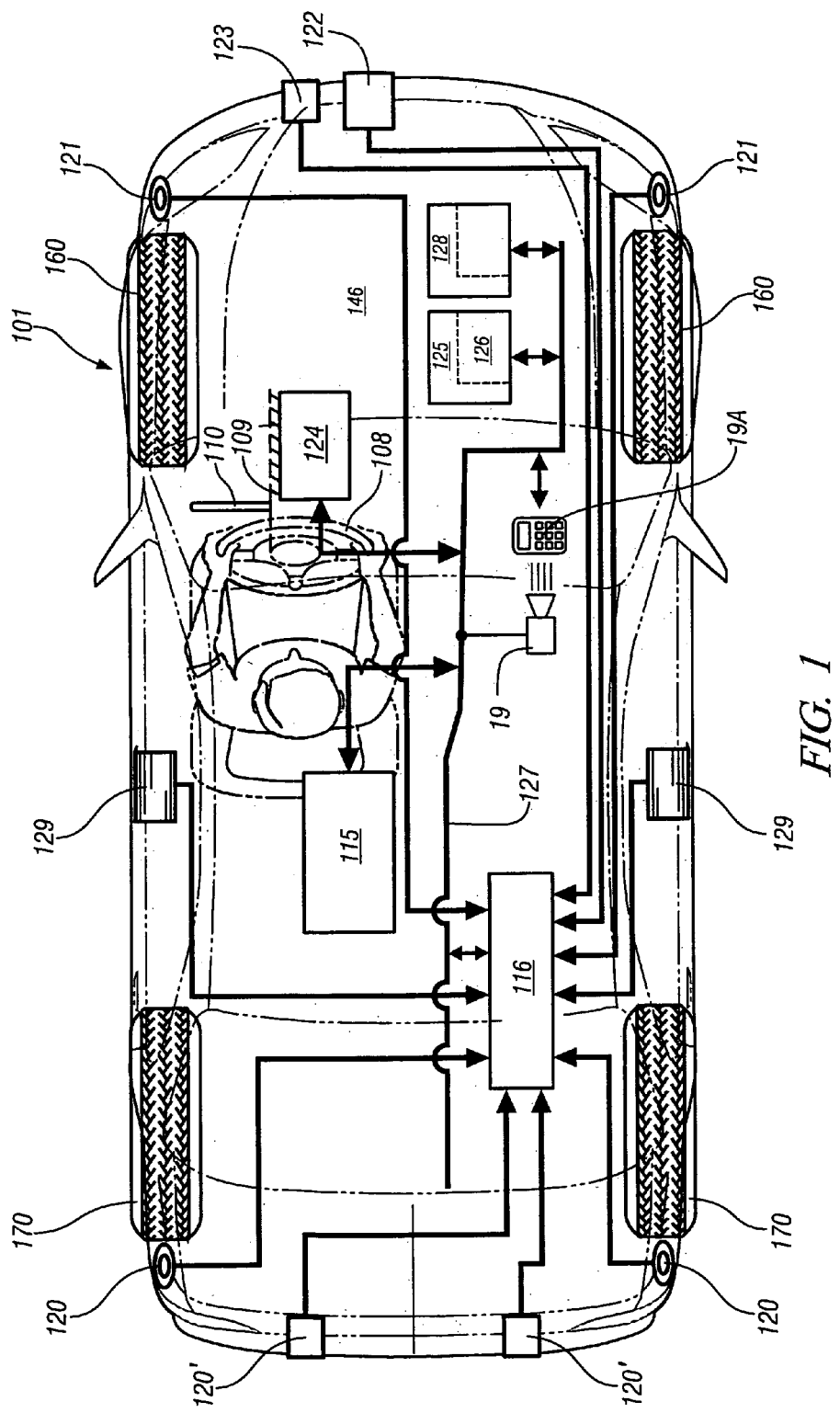
FIG. 1 is a schematic plan view of a subject vehicle in accordance with the disclosure.

Referring now to the drawings, wherein the showings are for the purpose of illustrating certain exemplary embodiments only and not for the purpose of limiting the same, FIG. 1 schematically shows a subject vehicle 101 including a four-wheel passenger vehicle with steerable front wheels 160 and fixed rear wheels 170. It is appreciated that the concepts described herein apply to other vehicles. The subject vehicle 101 includes a spatial monitoring system 116, a vehicle monitoring system 115, and a communications control module 19. The subject vehicle 101 is controlled using a powertrain control module (PCM) 125 and a vehicle control module (VCM) 128. The PCM 125 includes an adaptive cruise control system (ACC) 126 for controlling vehicle braking and acceleration to control vehicle speed and acceleration, including autonomous control of vehicle braking and acceleration to control vehicle speed and acceleration under predetermined conditions. The VCM 128 includes steering controller (STRG) 146 for vehicle lateral motion control. The spatial monitoring system 116, vehicle monitoring system 115, PCM 125, VCM 128, and communications control module 19 preferably communicate using a high-speed local area network communications bus 127. The spatial monitoring system 116, vehicle monitoring system 115, powertrain control module 125, and VCM 128 of the subject vehicle 101 are shown as discrete elements for ease of description. It should be appreciated that the functions described and performed by the discrete elements may be executed using one or more devices, e.g., implemented as algorithmic code, predetermined calibrations, hardware, and/or application-specific integrated circuitry (ASIC).

The spatial monitoring system 116 includes a control module signally connected to sensing devices operative to detect and generate digital images representing remote objects proximate to the subject vehicle 101. A remote object is said to be proximate to the subject vehicle 101 when the remote object may be detected by one or more of the sensing devices. The spatial monitoring system 116 preferably determines a linear range, relative speed, and trajectory of each proximate remote object and communicates such information using the communications control module 19. The sensing devices are situated on the subject vehicle 101, and include front corner sensors 121, rear corner sensors 120, rear side sensors 120', side sensors 129, and front radar sensor 122, and a camera 123 in one embodiment, although the disclosure is not so limited. Preferably the camera 123 includes a monochrome vision camera used for detecting forward lane markings. The front radar sensor 122 preferably includes a long-range radar device for object detection in front of the subject vehicle 101. The front radar sensor 122 preferably detects objects at a distance up to 200 m with a narrow field of view angle of around 15° in one embodiment. Due to the narrow field of view angle, the long range radar may not detect all objects in the front of the subject vehicle 101. The front corner sensors 121 preferably include short-range radar devices to assist in monitoring the region in front of the subject vehicle 101, each having a 60° field of view angle and 40 m detection range in one embodiment. The side sensors 129, rear corner sensors 120 and rear side sensors 120' preferably include short-range radar devices to assist in monitoring oncoming traffic beside and behind the subject vehicle 101, each having a 60° field of view angle and 40 m detection range in one embodiment. Placement of the aforementioned sensors permits the spatial monitoring system 116 to monitor traffic flow including proximate object vehicles and other objects around the subject vehicle 101. Data generated by the spatial monitoring system 116 is used by the lane mark detection processor 74 to estimate the roadway.

Alternatively, the sensing devices may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more object vehicle(s). Such sensing systems are employed for detecting and locating objects in automotive applications and are useable with systems including adaptive cruise control, collision avoidance, pre-crash safety, and side-object detection.

The sensing devices are preferably positioned within the subject vehicle 101 in relatively unobstructed positions. It is also appreciated that each of these sensors provides an estimate of actual location or condition of an object, wherein said estimate includes an estimated position and standard deviation. As such, sensory detection and measurement of object locations and conditions are typically referred to as "estimates." It is further appreciated that the characteristics of these sensors are complementary, in that some are more reliable in estimating certain parameters than others. Sensors may have different operating ranges and angular coverages capable of estimating different parameters within their operating ranges. For example, radar sensors preferably estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some sensors present parametric variances during operation, although overlapping coverage areas of the sensors create opportunities for sensor data fusion.

The vehicle monitoring system 115 preferably includes a plurality of on-board chassis monitoring sensing systems and devices for monitoring vehicle operation to determine vehicle motion states that are communicated to the communications bus 127. The vehicle motion states preferably include, e.g., vehicle speed, steering angle of the steerable wheels 160, and yaw rate. The on-board chassis monitoring sensing systems and devices include inertial sensors, such as rate gyros and accelerometers. The vehicle monitoring system 115 estimates the vehicle motion states, such as yaw-rate and lateral speed, and estimates lateral offset and heading angle of the subject vehicle 101. The measured yaw rate is combined with steering angle measurements to estimate the vehicle state of lateral speed. The vehicle monitoring system 115 generates signals associated with the vehicle motion states that may be monitored by other vehicle control systems for vehicle control and operation.

The powertrain control module (PCM) 125 is signally and operatively connected to a vehicle powertrain, and executes control schemes to control operation of an engine, a transmission and other torque machines, none of which are shown, to transmit tractive torque to the vehicle wheels in response to vehicle operating conditions and driver or operator inputs. The PCM 125 is shown as a single control module, but may include a plurality of control module devices operative to control various powertrain actuators, including the engine, transmission, torque machines, wheel motors, and other elements of a hybrid powertrain system, none of which are shown. The PCM 125 includes the adaptive cruise control system (ACC) 126 that controls vehicle braking and acceleration in response to operator control inputs detected using a human-machine interface (HMI) control module 124, including autonomous control of vehicle braking and acceleration to control vehicle speed and acceleration under predetermined conditions The VCM 128 is signally and operatively connected to a plurality of vehicle operating systems and executes control schemes to control operation thereof. The vehicle operating systems preferably include braking, stability control, and steering systems. The vehicle operating systems may also include other systems, e.g., HVAC, entertainment systems, communications systems, and anti-theft systems. The vehicle control module 128 is shown as single control module, but may include a plurality of control module devices operative to monitor systems and control various vehicle actuators. The VCM 128 includes the steering controller (STRG) 146 for vehicle lateral motion control. The steering controller 146 preferably includes an electrical power steering system (EPS) coupled with an active front steering system to augment or supplant operator input through a steering wheel 108 by controlling steering angle of the steerable wheels 160 during execution of an autonomic maneuver including a lane change maneuver. An exemplary active front steering system permits primary steering operation by the vehicle operator including augmenting steering wheel angle control when necessary to achieve a preferred steering angle and/or vehicle yaw angle. It is appreciated that the control methods described herein are applicable with modifications to vehicle steering control systems such as electrical power steering, four/rear wheel steering systems, and direct yaw control systems which control traction of each wheel to generate a yaw motion.

The passenger compartment of the subject vehicle 101 allows a vehicle operator to interact with the steering wheel 108, which is mounted on a steering column 109. An input device 110 is preferably mechanically mounted on the steering column 109 and signally connects to the human-machine interface (HMI) control module 124. Alternatively, the input device 110 may be mechanically mounted proximate to the steering column 109 in a location that is convenient to the vehicle operator. The input device 110, shown herein as a stalk projecting from column 109, includes an interface device by which the vehicle operator may command vehicle operation in an autonomic control mode, e.g., by commanding activation of autonomic vehicle control systems. The input device 110 preferably has control features and a location that is used by present turn-signal activation systems. Alternatively, other input devices, such as levers, switches, buttons, and voice recognition input devices may be used in place of or in addition to the input device 110.

The HMI control module 124 monitors operator requests and provides information to the operator including status of vehicle systems, service and maintenance information, and alerts commanding operator action. The HMI control module 124 signally connects to the communications bus 127 allowing communications with other control modules in the subject vehicle 101. The HMI control module 124 is configured to monitor a signal output from the input device 110, discern an activation signal from the vehicle operator based upon the signal output from the input device 110, and communicate the activation signal to the communications bus 127. The HMI control module 124 is configured to monitor operator inputs to the steering wheel 108, an accelerator pedal and a brake pedal. It is appreciated that other HMI devices and systems may include vehicle LCD displays, audio feedback, haptic seats, and associated human response mechanisms in the form of knobs, buttons and audio response mechanisms.

The subject vehicle 101 includes a communications control module 19 that has a wireless telematics communications system capable of extra-vehicle communications, including communicating with a communications network system 210 having wireless and wired communications capabilities. The communications control module 19 may include a wireless telematics communications system capable of extra-vehicle communications that includes short-range vehicle-to-vehicle communications. The communications network system 210 is shown with reference to FIG. 2. Alternatively or in addition, the control module 19 has a wireless telematics communications system capable of short-range wireless communications to a handheld device 19A, e.g., a cell phone or a satellite phone. In one embodiment the handheld device 19A is loaded with a software application that includes a wireless protocol to communicate with the control module 19, and the handheld device 19A executes the extra-vehicle communications, including communicating with a remote server via the communications network system 210. The subject vehicle 101 may also include a global positioning system 15 and a navigation system 17, which are useable to define a geographic location of the subject vehicle 101.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
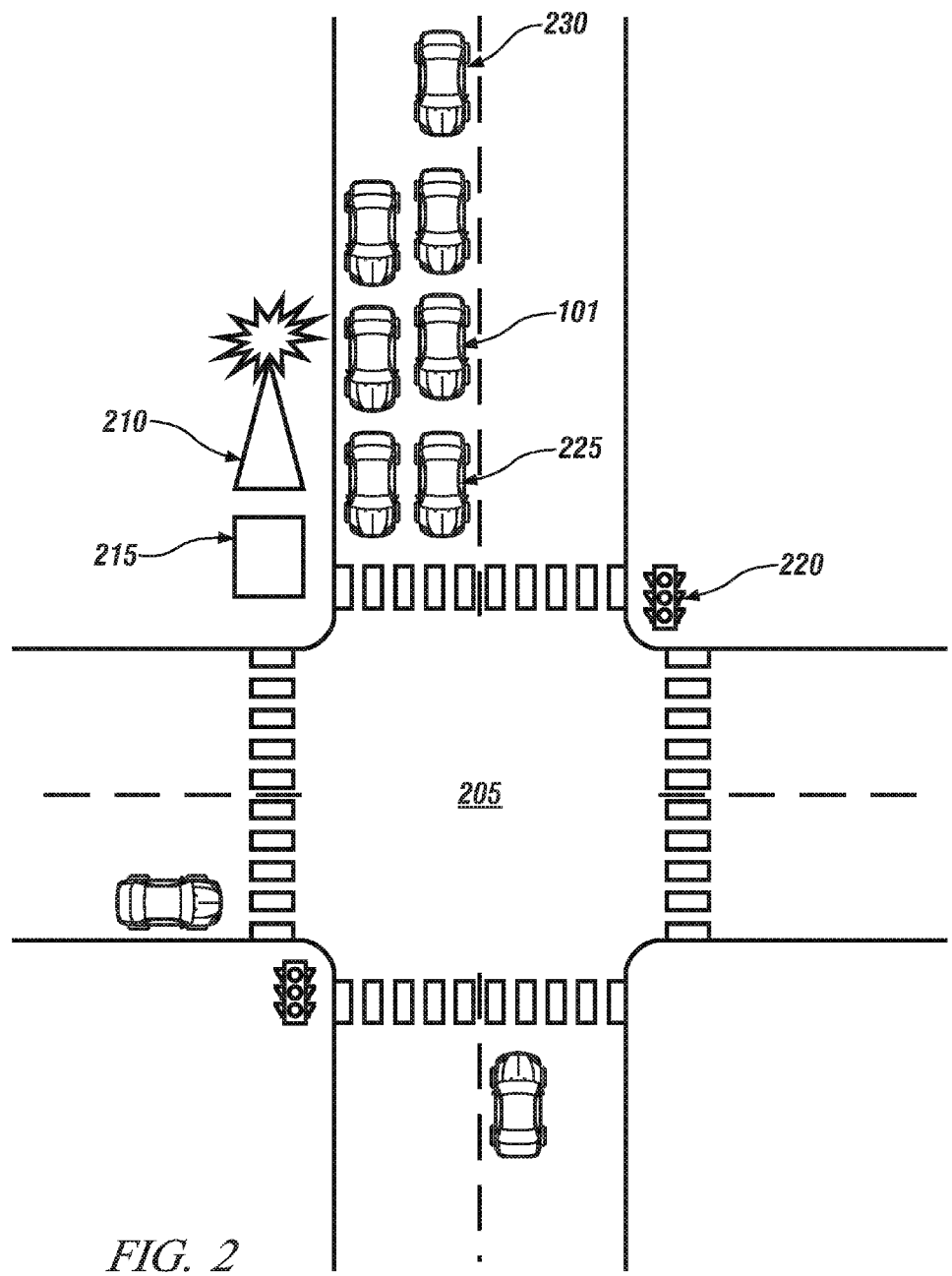
FIG. 2 shows a schematic plan view of a traffic intersection, and schematically depicts a subject vehicle and a preceding vehicle located in a common lane of travel in accordance with the disclosure.

FIG. 2 shows a plan view of a traffic intersection 205, and schematically depicts a subject vehicle, e.g., the subject vehicle 101 described hereinabove with reference to FIG. 1 and an object vehicle 225, which is a preceding vehicle located in a queue in a common lane of travel 230. The object vehicle 225 preferably immediately precedes the subject vehicle 101. A traffic control signal 220, for example a traffic control light or radio signal, is arranged to control traffic flow through the traffic intersection 205. In one embodiment there is an intelligent highway system 215 that is configured to monitor locations, speeds and trajectories of vehicles approaching and passing through the traffic intersection 205 and provide control operation of the traffic control signal 220. In one embodiment an inductive loop traffic sensor may be used to monitor operation of vehicles entering the traffic intersection 205, including monitoring a forward velocity and acceleration of the object vehicle 225. In one embodiment there is a wireless communications system 210 configured to communicate with the subject vehicle 101, including facilitating communications between the intelligent highway system 215 and the subject vehicle 101. This may include communicating a forward velocity and acceleration of the object vehicle 225 to the subject vehicle 101. Communications between the intelligent highway system 215 and the subject vehicle 101 may also include communication of the traffic control signal to the subject vehicle 101 and the object vehicle 125.

Figure 3:
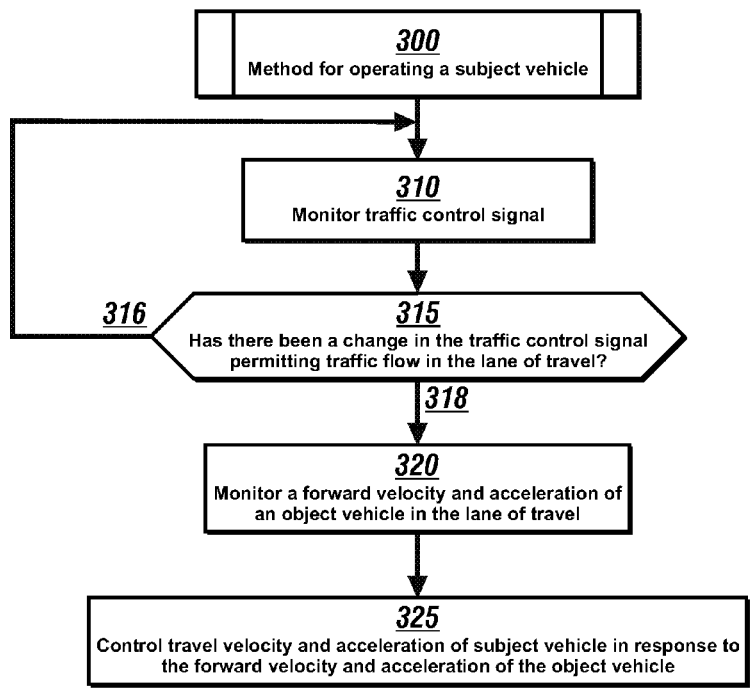
FIG. 3 is a flowchart that depicts a method for operating a subject vehicle at a traffic intersection using an autonomic vehicle control system to control vehicle velocity in accordance with the disclosure.

FIG. 3 shows a flowchart 300 that depicts a method for operating a subject vehicle, e.g., the subject vehicle 101 described hereinabove with reference to FIG. 1. The subject vehicle 101 includes an extra-vehicle monitoring system and an autonomic vehicle control system configured to control vehicle velocity. The extra-vehicle monitoring system may include on-board monitoring systems that include the spatial monitoring system 116 and the vehicle monitoring system 115 described with reference to FIG. 1. Alternatively, or in addition, the extra-vehicle monitoring system may include the wireless communications system 210 that is configured to communicate with the subject vehicle 101 facilitate communications between the intelligent highway system 215 and the subject vehicle 101 using the wireless telematics communications system of the communications control module 19. This preferably includes a capability to monitor the traffic control signal 220 to determine whether there has been a change in the traffic control signal 220 permitting traffic flow in the lane of travel 230 that includes the subject vehicle 101. This preferably includes communicating a forward velocity and acceleration of the object vehicle 225 to the subject vehicle 101. Alternatively, or in addition, the extra-vehicle monitoring system may include a vehicle-to-vehicle communications link using the aforementioned control module 19 using wireless telematics communications to communicate the forward velocity and acceleration of the object vehicle 225 to the subject vehicle 101.

The autonomic vehicle control system configured to control vehicle velocity preferably includes the adaptive cruise control system 126 for controlling vehicle braking and acceleration to control vehicle speed and acceleration, including autonomous control of vehicle braking and acceleration to control vehicle speed and acceleration under predetermined conditions such as described with reference to FIG. 3.

As described with reference to FIG. 3, operating the subject vehicle includes monitoring the traffic control signal 220 (310) to determine whether there has been a change in the traffic control signal 220 permitting traffic flow in the lane of travel 230 that includes the subject vehicle 101 (315). When there is no change in the traffic control signal 220 permitting traffic flow in the lane of travel 230 that includes the subject vehicle 101 (316), monitoring continues (310). When a change in the traffic control signal 220 permits traffic flow in the lane of travel 230 that includes the subject vehicle 101 (318), a forward velocity of the object vehicle 225 located in the lane of travel 230 of the subject vehicle 101 is monitored (320). In one embodiment, the forward velocity of the object vehicle 225 located in the lane of travel 230 of the subject vehicle 101 is monitored using the previously described front radar sensor 122. In one embodiment, the forward velocity of the object vehicle 225 located in the lane of travel 230 of the subject vehicle 101 is monitored by using the communications control module 19. The communications control module 19 communicates between the subject vehicle 101 and the object vehicle 225 to directly determine the forward velocity of the object vehicle 225. In one embodiment, the forward velocity of the object vehicle 225 located in the lane of travel 230 of the subject vehicle 101 is monitored by using the inductive loop traffic sensor to determine a forward velocity and acceleration of the object vehicle 225, which communicates to the subject vehicle 101 via the communications control module 19. In one embodiment, the forward velocity of the object vehicle 225 located in the lane of travel 230 of the subject vehicle 101 is monitored by using the inductive loop traffic sensor to determine a forward velocity and acceleration of the object vehicle 225, which communicates to the subject vehicle 101 via the communications control module 19.

Travel velocity and acceleration of the subject vehicle 101 are controlled in response to the forward velocity and acceleration of the preceding vehicle 225 (325). Controlling the travel velocity and acceleration of the subject vehicle 101 preferably includes synchronizing the travel velocity of the subject vehicle 101 with the forward velocity of the object vehicle 225. In one embodiment, the forward velocity of the subject vehicle 101 and the forward velocity of the object vehicle 225 located in the lane of travel 230 of the subject vehicle 101 are synchronously commanded to a common velocity by the intelligent highway system 215

Figure 4:
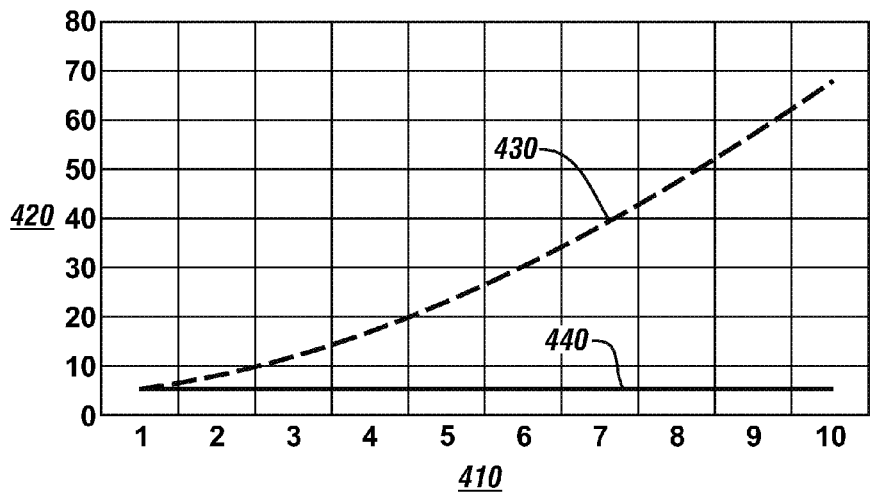
FIG. 4 is a datagraph showing a time delay corresponding to a quantity of waiting vehicles in accordance with the disclosure.

FIG. 4 is a datagraph that includes a vertical axis indicating a time delay associated with vehicle movement (420) and a horizontal axis indicating a quantity of vehicles waiting in a queue in a lane of travel at a traffic control signal (410). Operation of a system that does not the method described herein includes data set 430, which indicates that the time delay in vehicle movement monotonically increases with an increase in quantity of vehicles waiting. Conversely, the data set 440 indicates operation of a system that includes the method described herein, and indicates that there is no time delay associated with vehicle movement beyond the first vehicle in the queue in the lane of travel. As such, the method of operation may reduce time delay associated with vehicle movement beyond the first vehicle in the queue in the lane of travel when passing through an intersection, serving to reduce traffic congestion and achieve seamless traffic flow.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling vehicle procession from a traffic queue through an intersection, comprising:
   Monitoring, by an extra vehicle monitoring, movement of a first vehicle proceeding from a stopped position at the traffic queue at the intersection to moving through the intersection; and
   controlling, by the extra vehicle monitoring, a vehicle control system of a second vehicle following the first vehicle through the intersection to synchronize movement of the second vehicle through the intersection at a same velocity with the first vehicle movement through the intersection in the vehicle procession.

2. A method for operating a subject vehicle, the subject vehicle including an extra-vehicle monitoring system and an autonomic vehicle control system configured to control vehicle velocity in a vehicle procession from a traffic queue through an intersection, the method comprising:
   monitoring a traffic control signal with a communications system while the subject vehicle is in the traffic queue from a stopped position at the traffic control signal to move through the intersection; and
   upon detecting, by the extra-vehicle monitoring system, a change in the traffic control signal permitting traffic flow in a lane of travel including the subject vehicle:
      monitoring, by the extra-vehicle monitoring system, a forward velocity of an object vehicle preceding the subject vehicle in the lane of travel including the subject vehicle, and
      controlling, by the autonomic vehicle control system, to synchronize the vehicle velocity of the subject vehicle to be equivalent to a forward velocity of the object vehicle in the vehicle procession.

3. The method of claim 2, wherein controlling the travel velocity of the subject vehicle responsive to the forward velocity of the object vehicle comprises synchronizing the travel velocity of the subject vehicle with the forward velocity of the object vehicle.

4. The method of claim 2, wherein the traffic control signal comprises a traffic control light.

5. The method of claim 2, wherein the traffic control signal comprises a traffic control radio signal.

6. A system for controlling vehicle procession through an intersection, comprising:
   a communications system for communicating movement of a first vehicle proceeding from waiting in a queue from a stopped position at the intersection to moving through the intersection to a second vehicle following the first vehicle through the intersection; and
   a vehicle control system for the second vehicle for controlling the second vehicle movement through the intersection in synchronism with the movement of the first vehicle through the intersection such that the second vehicle moves through the intersection a same velocity as the first vehicle in the vehicle procession.

7. The system of claim 6 wherein said communications system comprises a vehicle-to-vehicle communications system wherein said movement of a first vehicle through the intersection is communicated to the second vehicle via the vehicle-to-vehicle communications system.

8. The system of claim 6 wherein said communications system comprises a vehicle-to-infrastructure communications system wherein said movement of a first vehicle through the intersection is communicated to the second vehicle via the vehicle-to-infrastructure communications system.

* * * * *